(12) United States Patent
Boland et al.

(10) Patent No.: US 7,573,864 B2
(45) Date of Patent: Aug. 11, 2009

(54) METHOD FOR REALTIME DIGITAL PROCESSING OF COMMUNICATIONS SIGNALS

(75) Inventors: Robert P. Boland, Wilmington, MA (US); Peter Simonson, Greenville, NH (US); Peter O. Luthi, Nashua, NH (US); Matthew J. Thiele, Hampstead, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1081 days.

(21) Appl. No.: 10/225,707

(22) Filed: Aug. 22, 2002

(65) Prior Publication Data
US 2004/0037253 A1 Feb. 26, 2004

(51) Int. Cl.
*H04J 3/06* (2006.01)
(52) U.S. Cl. .................................. 370/350; 370/509
(58) Field of Classification Search .............. 370/350, 370/509
See application file for complete search history.

(56) References Cited
U.S. PATENT DOCUMENTS

| | | | | |
|---|---|---|---|---|
| 6,253,094 B1 * | 6/2001 | Schmutz | | 455/562.1 |
| 6,272,132 B1 * | 8/2001 | Ofek et al. | | 370/389 |
| 6,763,057 B1 * | 7/2004 | Fullerton et al. | | 375/141 |
| 2002/0163918 A1 | 11/2002 | Cline | | |
| 2002/0174316 A1 | 11/2002 | Dale et al. | | |
| 2003/0069033 A1 * | 4/2003 | Edge et al. | | 455/502 |
| 2003/0162547 A1 | 8/2003 | McNair | | |

OTHER PUBLICATIONS

PCT International Search Report dated Apr. 26, 2004 of International Application No. PCT/US03/32336 filed Oct. 9, 2003.

\* cited by examiner

*Primary Examiner*—Jason E Mattis
(74) *Attorney, Agent, or Firm*—Robert K. Tendler

(57) ABSTRACT

In a communications or jamming system, accurate timing of the transmission of digitally processed signals is accomplished through the use of standard off-the-shelf components. In order to eliminate the need for high-cost, difficult to develop, specific digital hardware or realtime synchronous software not available from the standard off-the-shelf components, the output from the non-real time components is coupled to a realtime interface that assures nanosecond timing accuracy regardless of timing errors introduced by the off-the-shelf components. In one embodiment, the signals to be transmitted are digitized and then packetized, with the data to be transmitted reconstructed using non-real time digital processing. In order to establish the exact time for transmission, the packet is given a time stamp in the form of a header which indicates the exact time at which the packet is to be transmitted by the communications system, with the packet with header being transmitted to a storage buffer, the output of which is coupled to a realtime interface including a precise time output gate, the timing of which is controlled by a precision time reference having nano-second accuracy.

10 Claims, 2 Drawing Sheets

METHOD FOR REALTIME DIGITAL PROCESSING OF COMMUNICATIONS SIGNALS

FIELD OF INVENTION

This invention relates to communications systems and more particularly to a method and apparatus for accurately controlling the transmission of communications signals.

BACKGROUND OF THE INVENTION

When building either a communications system or, for instance, a jamming system, it is important that a particular pattern of RF energy be transmitted and that this transmission be made to occur at a precise time. The signals to be transmitted are usually reconstructed from an original signal after the original signal has been processed. Whether the transmission contains analog or digital information, it is important that the reconstructed signal be transmitted at a particular point in time.

This is especially true in communications systems such as time division multiple access systems, in which data is allocated to particular timeslots. In the past, in order to make sure that the data is transmitted exactly at the particular instant of time necessary to place the necessary data in a particular timeslot, the entire transmitting system or indeed, for instance, the entire radio must have timing for each of its parts which is sufficiently accurate so that the signals are in fact transmitted at the appropriate time instant.

This means that assuming, for instance, information is coming in which is converted from analog to digital by an analog-to-digital converter, and further assuming, for instance, that digital processing is used to further process the digitized original signal, and even further assuming that the output of the digital processing is coupled with a digital-to-analog converter coupled to a transmitter, then it will be appreciated that if the transmission is to occur at a precise instant in time, the timing associated with all of the above components must be exceedingly accurate. Thus the problem is that there must be real time processing throughout all of the components used in generating the signal. This requires knowledge of any latency characteristics or delays, along with the provision of an exceedingly accurate timing standard for each one of the components. Note that for purposes of the present invention realtime means better accuracy than that available from standard off-the-shelf products, for instance, nanosecond accuracy.

Achieving such realtime accuracy is an expensive costly process involving specialized hardware that is developed for each and every application.

The result is whether one is dealing with communications equipment or, for instance, jamming systems in which jamming pulses must be emitted with a particular signature at a particular instant of time, in the past the elements themselves making up the entire system must have their timing so carefully constrained and controlled that timing errors are reduced to nanoseconds. It is thus only with difficulty with commercial off-the-shelf products that one can arrange for this type of accuracy.

For instance, if a general-purpose digital processing circuit is used to in any way alter or process an input signal, about the best accuracy commonly available with standard clocks is millisecond accuracy. The dominant source of timing error thus resides in the digital processing circuitry, with millisecond accuracies being insufficient for many applications. The result is that common digital processing units such as general-purpose processors do not provide for the transmission of signals at the precise point in time required. While general purpose processors are in fact quite common and inexpensive, these processors cannot without massive specialized reconfiguration be used to create accurately timed transmissions.

In short, the problem in the past is that the elements making up the communications system must themselves be controlled to nanosecond accuracies to provide the real time result.

SUMMARY OF THE INVENTION

Rather than having each of the elements in the communication chain be so tightly controlled and therefore expensive, in the subject invention only a single element, namely a precision output gate, must be provided to guarantee transmission of a signal at a precise start time.

In order to accomplish this for any generalized type of communications system, digitized information is coupled to a digital processing unit that is a general-purpose processor provided with a system clock which, for instance, is only capable of millisecond accuracies. The purpose of the general-purpose digital processor is to process inputted signals and to provide packetized data, with each packet being time-stamped to indicate the exact instant at which the information contained in the packets should be transmitted. The packets are therefore provided with a time header followed by the remainder of the data, which in one embodiment is coupled to a packet storage buffer. The output of the packet storage buffer is coupled to a precise time output gate which has as its time reference a precision time reference, in one embodiment, a rubidium oscillator or clock. The gate thus establishes the required nanosecond accuracy.

The information from the packet storage buffer is read out by the precision time output gate in accordance with the time specified by the header of the packet. Thus, the subject system has the ability to generate data in packetized form and places a time tag as a header to the packet, where the time tag indicates when the data should be sent out. Note that the time stamped packets of data are generated with components all working in non-real time.

As will be seen, it is only the gate that is synchronized with a precision time standard. Thus, the packet is transmitted at a time controlled by a precision time reference and is not corrupted by any latencies and more inaccurate time references used in general purpose computing.

It will be appreciated that the time delays associated with the digital-to-analog converter used after the precision time output gate as well as the transmitter are not the dominant source of timing error. Thus, while standard off-the-shelf components are capable of providing millisecond accuracy at reasonable cost, nanosecond accuracy is achieved by providing, only a small interface card. As a result, the remainder of the system need only exhibit millisecond accuracy.

While heretofore an entire radio had to be synchronized to transmit TDMA signals, now it is only the interface card that must be a real time device. It will be appreciated that the interface card is all that is needed to be synchronized by a precision clock, with the rest of the communications chain working at its own pace.

In short, while one might have to have had precision control in the timed generation of signals themselves so that they come out at a particular time, with the subject invention one does not have to pay particular attention to the generation of the data as long as when it comes out there is sufficient time to precision gate it out.

Applications for the precisely timed outputs can be understood when considering handset-based TDMA wireless transmissions. In the past, in order for these transmissions to properly allocate data into particular time slots, the entire radio had to have precise timing characteristics. With the subject invention, the only thing that needs to have a precise timing characteristic is the interface card with the precision output gate.

Another application requiring precisely time transmissions is when one has to generate synchronized radar pulses. It is oftentimes the case that radar pulses must be moved in time or jittered, with the jitter under computer control. The control of the jitter requires precise timing. With the subject invention, the jittering can be generated off-line and then gated to the radar transmitter with precise timing.

Likewise, when it is important in jamming scenarios to generate jamming pulses having a particular signature or content at a precise time, it is important to be able to time these pulses so as to spoof or otherwise provide inaccurate misinformation to the object being jammed. While presently specialized apparatus is provided throughout the communications chain in the generation of the jamming signal, through the utilization of the subject invention, commercial off-the-shelf products may be utilized to generate the jamming pulses, with the timing of the jamming pulses being controlled simply by the precision timed gate.

While in some instances, it is the general purpose processor which determines the time at which a packet is to be transmitted and therefore generates the time stamps, in another embodiment, time stamps may be supplied to the general purpose processor through an analog-to-digital converter which is in turn coupled to a receiver, such that the receiver specifies what the time stamp should be.

In short, the dominant source of timing error, involving the general-purpose processor is removed from the precision time path so that non-dominant errors are removed as a source of timing error.

With respect to the precision time reference, it will be appreciated that off-the-shelf rubidium oscillators are available to provide nanosecond timing. These devices can be used in a precision time clock which may be slaved to real time through the receipt and use of timing signals from global positioning satellites. Thus, while the internal timing accuracy is determined by the rubidium oscillator clock, the clock can be set with respect to Greenwich Mean Time through the use of ultra-accurate timing signals from GPS satellites. Since for telecommunications purposes, cell sites and other transmitters depend on GPS signals for their timing, the precision time reference described above when slaved to the GPS-generated time source can be considered the ultimate in a real time clock.

In summary, in a communications system, accurate timing of the transmission of reconstructed signals is accomplished through the use of standard off-the-shelf components to create the appropriate signals. In order to eliminate timing errors caused by the standard off-the-shelf components, the output from the non-real time components is coupled to a realtime interface that assures nanosecond timing accuracy regardless of timing errors introduced by the off-the-shelf components. In one embodiment, the signals to be transmitted are digitized and then packetized, with the data to be transmitted assembled using non-real time digital processing. In order to establish the exact time for transmission, the packet is given a time stamp in the form of a header which indicates the exact time at which the packet is to be transmitted by the communications system, with the packet with header being transmitted to a storage buffer, the output of which is coupled to a realtime interface including a precise time output gate, the timing of which is controlled by a precision time reference having nano-second accuracy.

As long as the general purpose digital processing provides packetized data with the sufficient time to be able to transmit the data at a particular time, the precise moment at which the data is transmitted is controlled by the precision time reference, which in one embodiment includes a rubidium oscillator or clock. The result is that while the dominant source of timing error is in the general purpose digital processor, this source of timing error is removed from the precision time path through the packet storage buffer and the precision gating which responds to the time stamp to know exactly when to transmit the associated data. In one embodiment, the gated data is converted to an analog signal with the use of a digital-to-analog converter that has minimal impact on timing.

BRIEF DESCRIPTION OF THE DRAWINGS

These and other features of the subject invention will be better understood in conjunction with the Detailed Description in connection with the Drawings, which.

DETAILED DESCRIPTION

Figure 1:
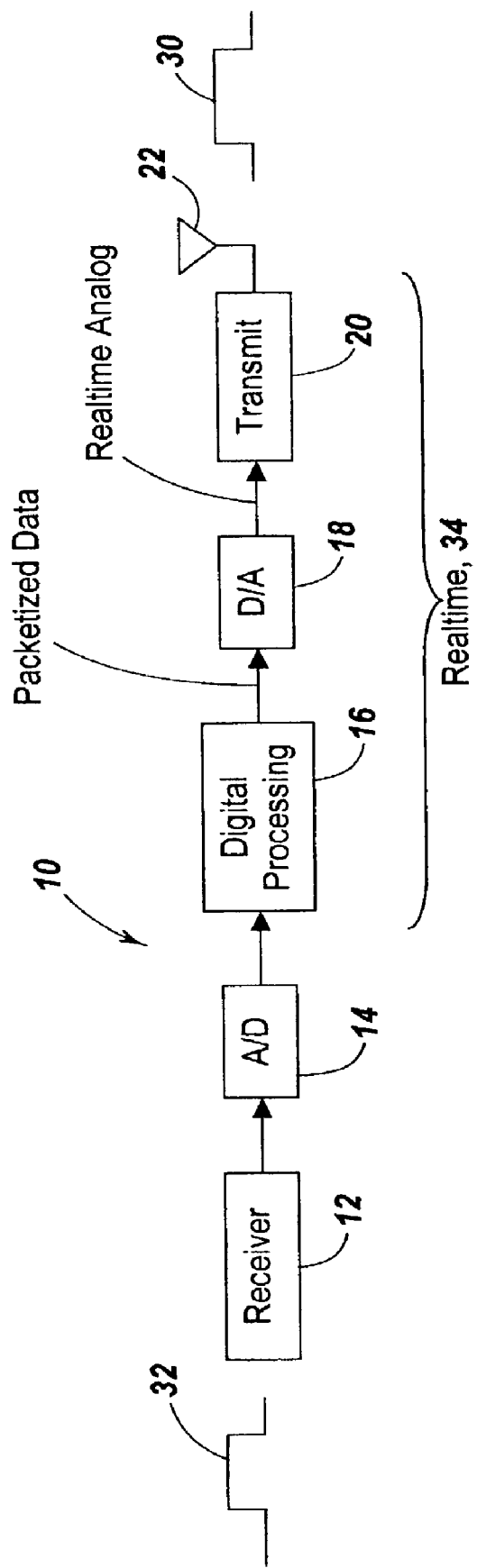
FIG. 1 is a block diagram of a prior art communications system in which both the digital processing and a digital-to-analog converter as well as a transmitter contribute to the real time performance of the system, with the digital processing required to be of a specialized variety to achieve the required timing accuracy; and, FIG. 2 is a block diagram of the subject system in which a general purpose processor having on critical timing clock is used to generate timestamps and data packets which are coupled to a packet storage buffer in turn coupled to a precision time output gate through which information from the general purpose processor is transmitted at a particular and accurate point in time.

Referring now to FIG. 1, a communications system is generally designated by reference character 10 to include in one embodiment a receiver 12, an analog-to-digital converter 14, a digital processing unit 16 coupled to a digital-to-analog converter 18 that is, in turn coupled to a transmitter 20. If, as an example, the system is one in which receiver 12 detects an incoming signal to be used for jamming, the system is designed to convert it via an analog-to-digital converter to a digital signal to be used by digital processing unit 16 to alter it for jamming purposes. The altered signal is the reconstructed signal. Thereafter, the digital signal is converted via digital-to-analog converter 18 and is transmitted by transmitter 20 over antenna 22 to, for instance, a perceived threat such as a targeted threat.

It will be appreciated that if it is important that the signal be transmitted by transmitter 20 at a precise instant in time, then all of the elements including the digital processing unit, the digital-to-analog converter and the transmitter must have accurately controlled latencies or delays and must further have a precision clock in order to ensure that the transmission occurs at exactly the instant of time that it should. The result is that there must be real time processing throughout, including the digital processing circuit.

This means that very specialized hardware or real time software components must be introduced into the communications chain so as to ensure the exact time of the output from transmitter 20. Not only must the clock to all of the digital elements be precise, in order to provide exceedingly accurate timing, one must have full knowledge of latency characteristics in any of the elements involved.

As mentioned hereinbefore, this means specialized attention to all of the elements in the communications chain including careful calibration and control to take into account all of the characteristics of the individual elements.

If for instance it is desired to send out a pulse of information having a start time that has a predetermined delay, for instance, from a waveform entering receiver 12, as can be seen by pulse 30, its delay from a pulse 32 which enters the receiver must be controlled through very accurate timing and delay control for the elements between receiver 12 and transmitter 20.

What this means is that regardless of the type of communications chain established, the problem is that there must be realtime processing throughout, meaning that each and every element in the communications chain must have its function totally understood, totally calibrated and totally controlled so that the result of the cascading of the elements is the transmission of a signal at a precise time.

If rather than having a receiver 12, another source of data such as for instance human speech is to be generated, if the speech is then to be processed digitally, this analog data is converted to digital data and processed in the appropriate manner. For time division multiple access communications channels, it will be appreciated that the analog data transmitted must be transmitted in a timeslot which is appropriate. Millisecond timing accuracies associated with standard clocks for digital processors are insufficient to maintain the analog data from one user in his or her particular timeslot.

In order to make certain that this is not the case, a great deal of effort to achieve precise timing synchronization is expended in each and every element of the communications chain so that the information is placed at the appropriate timeslot.

As can be seen, those elements which are critical to the transmission of data at a precise time are those indicated by bracket 34 to be those elements in the illustrated embodiment which are to have carefully controlled and accurate clocks so as to minimize any sources of error. Clearly, the digital processing portion of the communications chain is the most difficult element to control due to the specialized timing processing required.

Figure 2:
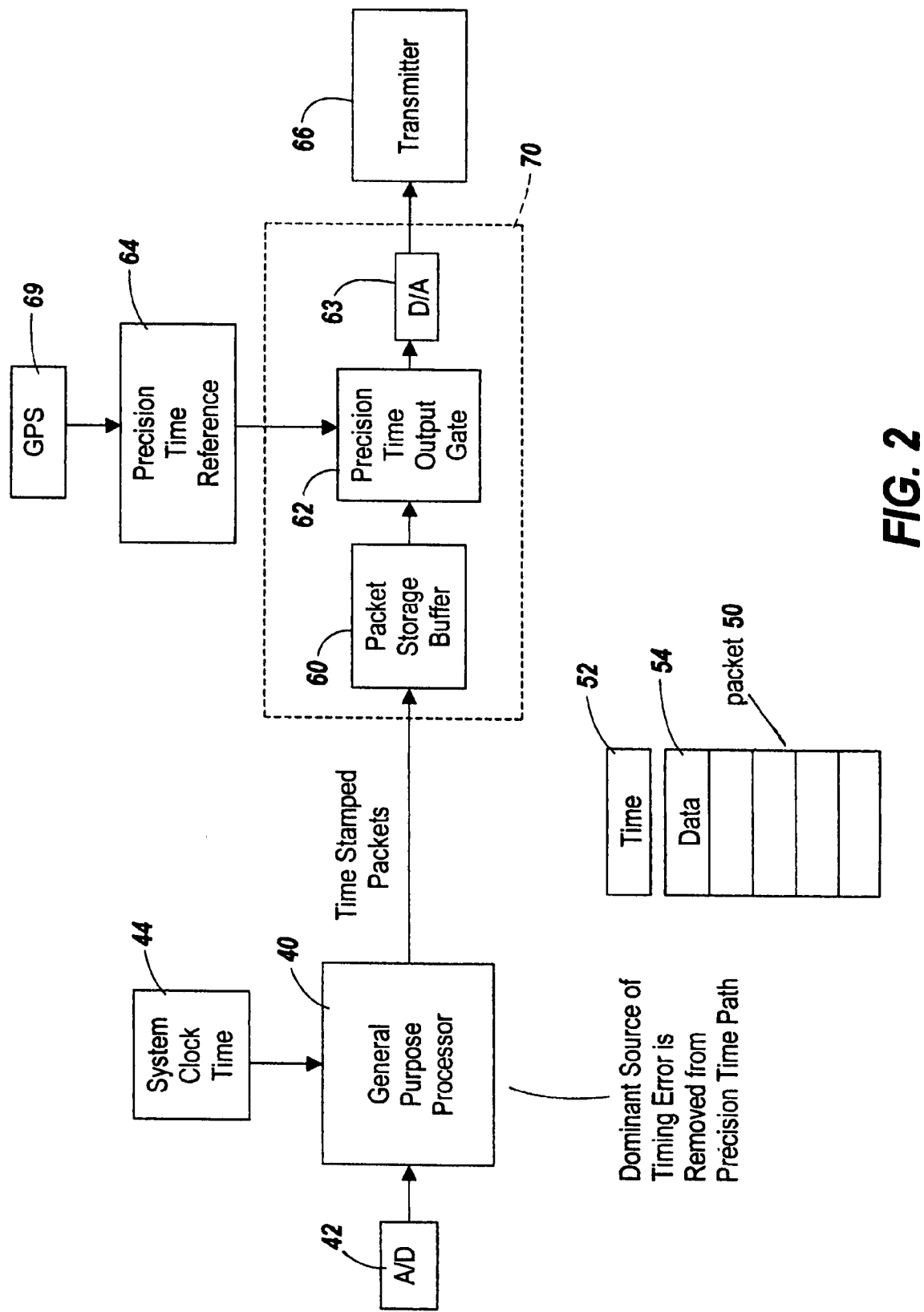

Referring now to FIG. 2, in the subject invention, an off-the-shelf processor 40 is provided rather than the special purpose processor 16 in FIG. 1. Here the information to be transmitted is sampled by analog-to-digital converter 42, with the digital data being processed by processor 40 using a system clock 44 that general need only have millisecond accuracies. The off-the-shelf processor can be any one of a number of garden-variety processors, with the system clock also being available commercially.

Processor 40 generates the data packets to be transmitted and also provides the packets with a time header such that each of the packets is time stamped. Here as can be seen, a packet 50 has a time stamp in header 52, with data 54 existing below header 52.

The time stamp specifies when the data should begin to be transmitted, with the accuracy determined by the accuracy of the time specified by the time stamp.

The result is a number of time stamped packets from processor 40 which are stored at a packet storage buffer 60 until such time as they are read out through a precision time output gate 62 provided with a precision time reference 64.

In one embodiment, the buffer is read out at 61 to establish the time that the packet is supposed to be sent. This is compared at 65 with the current time, and when the two match, the packet is gated out by gate 62 at a rate determined by the precision time reference.

The buffer is thus read out at a precise time by gate 62 whose output is then coupled to a digital-to-analog converter 63 and thence to a transmitter 66.

The precision time reference is accurate in one embodiment to nanoseconds and is provided in one instance through the use of a rubidium oscillator clock. This clock is an off-the-shelf product.

The precision time reference in one embodiment may be slaved to GPS timing signals by coupling a GPS receiver 68 to the precision time reference unit 64, with the precise time then being referenced the time established by the GPS satellites.

It will be appreciated that a dominant source of timing error is associated with processor 40 which is an off-the-shelf product and which is not at all specially configured. The function of processor 40 is to generate data and time stamp the corresponding packets that are then stored and read out at precise times in accordance with the precision time output gate.

As will be seen, the dominant source of timing error associated with the off-the-shelf processor is removed from the precision time path through the use of the buffering and the precision time output gate, with the time delays and latencies associated with the digital-to-analog converter 63 and transmitter 66 being but a small percentage of the overall process. Moreover, time delays through the digital-to-analog converter and transmitter are quite easily controlled, are predictable and are thus taken into account in any calibration process.

One could consider that the precision time output gate along with the packet storage buffer and the digital-to-analog converter constitutes an interface card or device 70, the characteristics of which are controlled by the precision time reference and the characteristics of the precision time output gate.

In short, by using a commercial off-the-shelf processor without having to take into account real time considerations and by removing it as the dominant source of timing error in the precision time path, it is possible to provide a communications system in which only a small fraction of the elements of the system need to have precisely timed components and in which only a small fraction of the components need to be carefully controlled in order to provide the real time output desired.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for using standard off-the-shelf components to generate and transmit analog RF waveforms, comprising the steps of:

creating a realtime analog RF waveform having periodic waveform components by digital-to-analog conversion of a packet of data using a digital-to-analog converter, the packet having a header and a time stamp such that the timing of the generation of the periodic components of the waveform is controlled by packet contents to nanosecond accuracies greater than the accuracy associated with frame timing accuracies;

generating the packets using non-realtime off-the-shelf components; and, gating the packets to the digital-to-analog converter using a realtime interface including a precision clock having nanosecond accuracy greater than an accuracy associated with frame timing, such that the analog RF waveform is created by coupling the contents of the packet to the digital-to-analog converter when the time stamp of the header in the packet matches the current time from the realtime precision clock, thus to create the start of the periodic waveform to said nanosecond accuracy and to create each of the following periodic analog RF waveform components with nanosecond accuracy, whereby timing errors of the off-the-shelf components are not dominant.

2. The method of claim 1, wherein the accuracy of the timing used for the creation and transmission of the components of the analog RF waveform is sufficiently high to assure accurate timing of each of the components of the analog RF waveform; and, wherein the packet-generating step includes providing each of the packets with a header having a timestamp indicating the precise time at which the beginning of the analog RF waveform is to be created, and wherein the gating step includes gating the packet at the time specified by the timestamp.

3. The method of claim 2, wherein the gating step includes buffering the packets prior to gating.

4. The method of claim 3, wherein the gating step includes providing time from a realtime clock and comparing the time from the realtime clock with that of the timestamp, and when the two times match gating the packet to the digital-to-analog converter for transmission.

5. The method of claim 4, wherein the realtime clock has a nanosecond accuracy.

6. The method of claim 5, wherein the realtime clock includes a rubidium oscillator.

7. The method of claim 1, wherein the timing accuracy for the non-realtime components is in the millisecond range.

8. The method of claim 1, wherein the realtime timing accuracy is greater than that of the non-realtime components.

9. The method of claim 1, wherein the realtime accuracy is in the nanosecond range.

10. The method of claim 5, wherein the realtime clock includes a GPS receiver for providing an absolute time reference.

* * * * *

UNITED STATES PATENT AND TRADEMARK OFFICE
CERTIFICATE OF CORRECTION

PATENT NO. : 7,573,864 B2
APPLICATION NO. : 10/225707
DATED : August 11, 2009
INVENTOR(S) : Boland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1361 days.

Signed and Sealed this

Seventh Day of September, 2010

David J. Kappos
*Director of the United States Patent and Trademark Office*